United States Patent [19]
Rupprecht et al.

[11] 3,742,794
[45] July 3, 1973

[54] GLASS HANDLING AND CUTTING SYSTEM

[75] Inventors: Charles F. Rupprecht; Frank Wiker, both of Memphis, Tenn.

[73] Assignees: Binswanger Glass Co., Richmond, Va.; Charles F. Rupprecht, Memphis, Tenn.

[22] Filed: Feb. 10, 1972

[21] Appl. No.: 225,091

Related U.S. Application Data
[62] Division of Ser. No. 70,121, Sept. 8, 1970, Pat. No. 3,668,955.

[52] U.S. Cl. ............... 83/12, 83/590, 225/96.5
[51] Int. Cl. .............................. B26d 3/08
[58] Field of Search ................. 83/6, 10-12, 83/7, 8, 590; 225/96.5; 33/32 C

[56] References Cited
UNITED STATES PATENTS

| | | | |
|---|---|---|---|
| 1,117,736 | 11/1914 | Whittemore | 225/96.5 |
| 2,273,716 | 2/1942 | Louviaux et al. | 33/32 C |
| 2,576,564 | 11/1951 | Brichard et al. | 33/32 C |
| 2,601,725 | 7/1952 | Henry et al. | 33/32 C |
| 3,227,016 | 1/1966 | Moeller | 83/11 |

*Primary Examiner*—J. M. Meister
*Attorney*—John R. Walker, III

[57] ABSTRACT

A system for handling plate glass and for cutting same. The system includes a self-propelled apparatus on tracks movable to positions adjacent selected bins, containing the substantially vertically disposed glass, located adjacent the tracks. The apparatus includes a tiltable top assembly for tilting to a substantially vertical loading position for loading the glass from the selected bin, and includes power-actuated retrieving means for attachment to the glass to pull the glass from the bin to the top assembly. After loading, the top assembly is moved into a horizontal position. The apparatus includes means for scoring the glass by a single operator shoving a carriage means across a bridge means to the other side of the apparatus where there is located bumper means for returning the carriage means to the operator's side of the top assembly and trip means for disengaging the cutter means from the glass.

4 Claims, 13 Drawing Figures

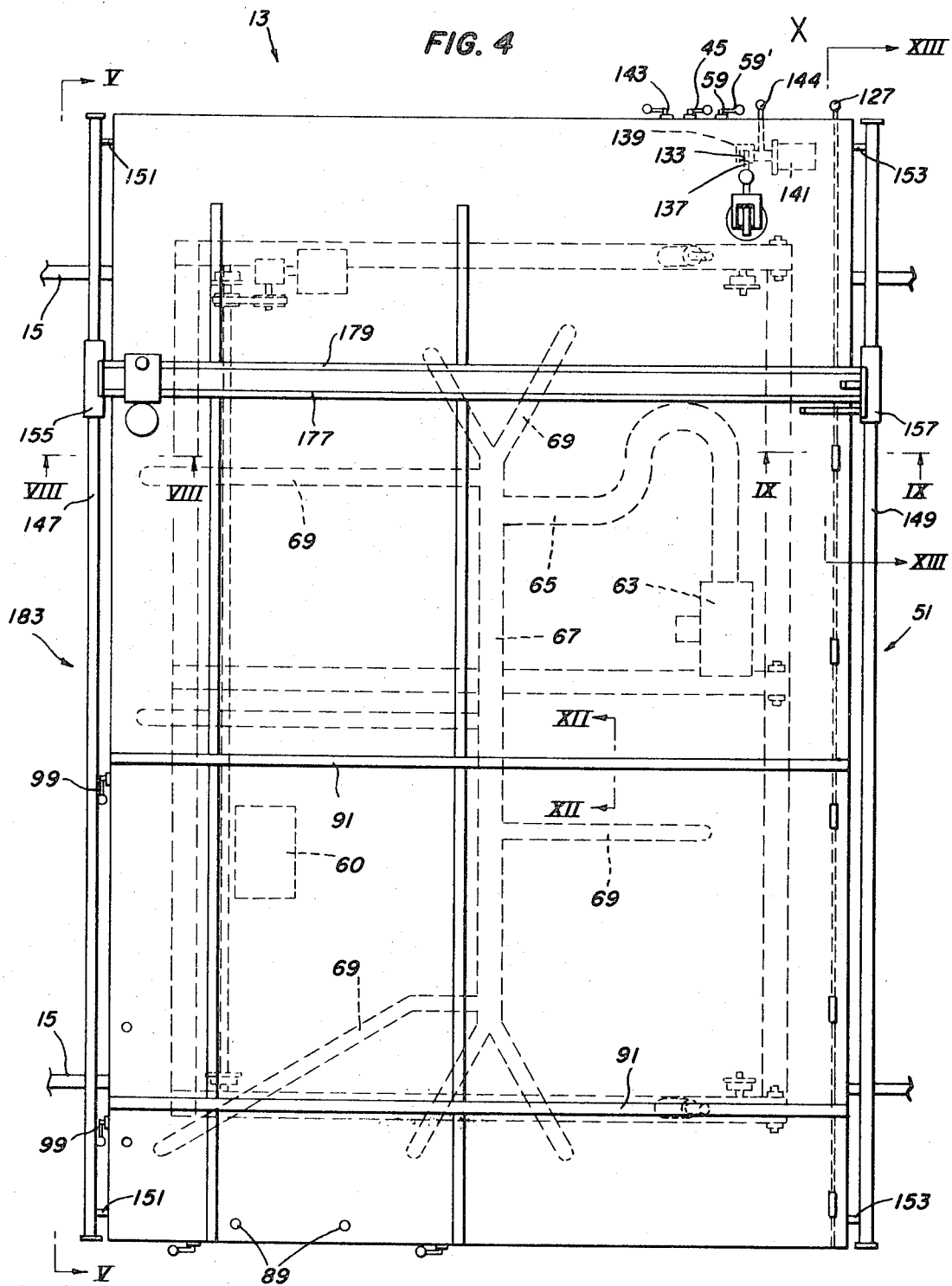

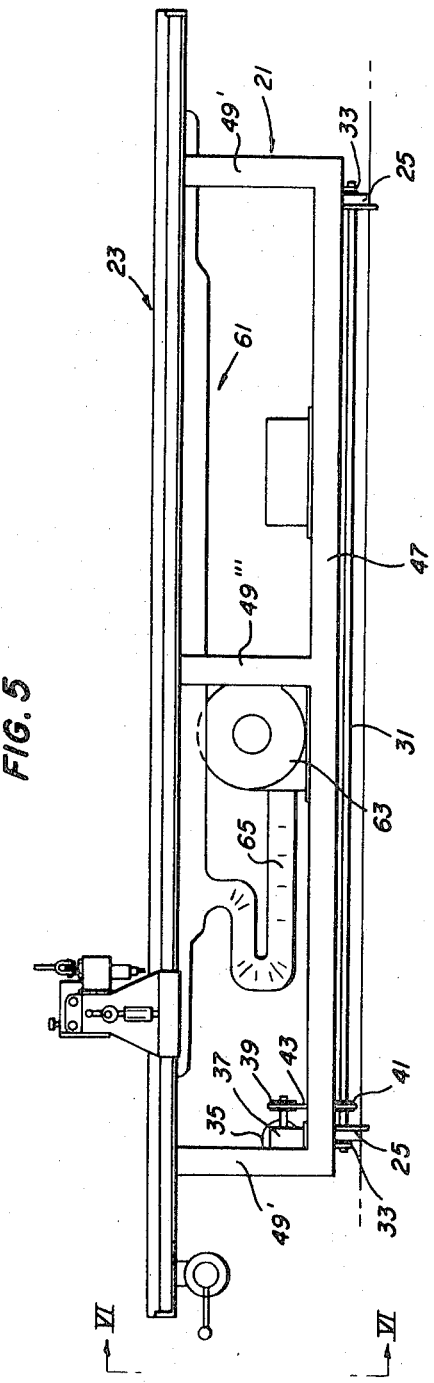
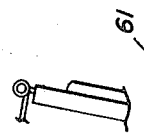
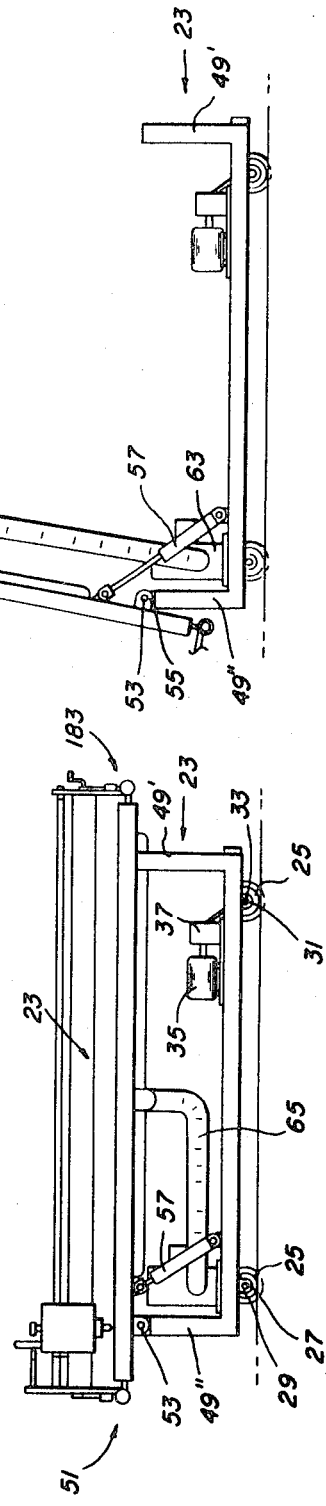

GLASS HANDLING AND CUTTING SYSTEM

CROSS REFERENCE TO RELATED APPLICATION

This application is a divisional application of application Ser. No. 70,121, filed Sept. 8, 1970, entitled GLASS HANDLING AND CUTTING SYSTEM, now U.S. Pat. No. 3,668,955.

BACKGROUND OF THE INVENTION

1. Field of the Invention

This invention relates to systems for handling plate glass and for cutting same.

2. Description of the Prior Art

The typical method of handling plate glass prior to cutting is as follows: The plate glass is received via truck and/or railroad gondola. This glass is crated and the cross section dimensions of the glass in the crate would average about 5 inches. The over-all width of the crate would average 10 inches. It takes, on the average, three men one-half day to unload the average shipment. The glass is generally moved to a secondary storage area. As the need arises, the crate is moved to a primary storage area where the end cap or the side is removed, exposing the glass. Various methods, such as the following, are used to retrieve glass from the crate and convey same to the cutting table with three or four men being required to perform this function: (1) Pull the glass manually out of the crate onto a skate dolly; (2) Same as (1) but lift with a vacuum cup via a hoist; (3) Same as (2) except the crate is parallel to the aisle with the side open; (4) Same as (2) except a plate glass grab is used.

Once the large plate glass is on the table, the typical method is to handle, measure, cut and break the glass by hand, requiring the cutter to climb on top of the table to score the glass, and helpers to lift the glass to insert the straight edge to facilitate the break.

Some of the disadvantages of the typical above-described methods are as follows:

1. High cost of unloading the glass.
2. Need for secondary storage area.
3. Crates requiring 50 percent more storage space than the contents.
4. Manpower to retrieve the glass.
5. Safety hazards in retrieving glass manually.
6. High cost of labor to handle and to cut the glass once it is on the table.
7. High cost of crate disposal from the warehouse.

A preliminary search revealed the following U. S. Pat. references: 1,117,736; 1,946,356; 2,793,471; 3,181,757; 3,216,635; 3,253,756 and 3,424,357.

In addition to the above-mentioned patent references, applicants are aware of a cutting device adapted to be placed on top of the sheet of glass to be cut and which includes a track upon which is mounted a cutter that is manually shoved so that it moves across the track from one side to the other of the table upon which the glass is placed. There are two operators involved with one shoving the cutter for causing it to move to cut the glass and the other operator shoving the cutter back to the first operator.

SUMMARY OF THE INVENTION

It is a primary concept of the present invention to reduce manhours in handling the glass from storage to the cutting thereof and to reduce manhours during the cutting operation.

The means by which the foregoing concept is accomplished by the present invention includes the provision of a self-propelled apparatus on tracks which is under the control of a single operator and which is movable to a position adjacent the selected bin containing the substantially vertically disposed sheets of glass located adjacent the tracks. The apparatus includes a tiltable top assembly for tilting between a substantially vertical loading position for loading the glass from the selected bin and includes a power-actuated retrieving means for attachment to the glass to pull the glass from the bin to the top assembly. After loading the glass, the top assembly is power-actuated under the operator's control to a horizontal position. The apparatus includes means for scoring the glass by the single operator shoving a carriage means across a bridge means to the other side of the apparatus where there is located bumper means for returning the carriage means to the operator's side of the table and trip means for disengaging the cutter means from the glass.

None of the prior art devices known to applicants disclose or suggest the above-mentioned concept of a self-propelled apparatus on tracks wherein the top assembly is tiltable to a position in line with the glass in the bin, from where the glass is pulled onto the top assembly by a power-actuated retrieving mechanism. This is in contrast to the heretofore-mentioned U.S. Pat. No. 1,946,356, which has a tiltable top on a stationary base and the plate glass is brought to the table on a vacuum frame or carrier.

In addition, none of the prior art known to applicants discloses the heretofore-mentioned concept wherein the machine can be operated by a single operator, who can perform all the functions necessary in loading the glass and cutting same. In other words, the single operator can stand on one side of the top assembly, make the necessary set-up for the desired cut, and then shove the glass cutter-containing carriage across the table or top assembly to the other side where the glass cutter is released from the glass and a bumper causes the carriage to return to the operator. Also, it should be pointed out that the top assembly has all the necessary means so that the single operator can position the glass on the top assembly before cutting and for the breaking thereof. Thus, the top assembly has air flotation means and cylinder-actuated breaking means for breaking the glass after being cut or scored.

Further objects, advantages, and differences between the present invention and the prior art will be apparent from the more detailed description to be given hereinafter.

BRIEF DESCRIPTION OF THE DRAWINGS

FIG. 4 is a plan view of the self-propelled apparatus of the present invention.

FIG. 5 is a side elevational view taken as on the line V—V of FIG. 4.

FIG. 6 is an end elevational view taken as on the line VI—VI of FIG. 5, with the top assembly being shown in the horizontal position.

FIG. 7 is a view similar to FIG. 6 but showing the top assembly in a tilted position, and with parts thereof being removed.

DESCRIPTION OF THE PREFERRED EMBODIMENT

Figure 1:
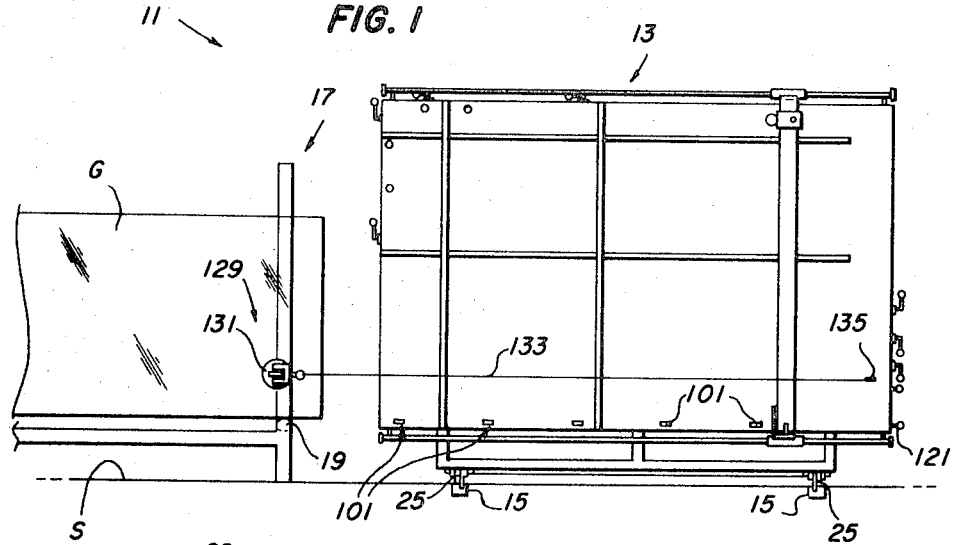
FIG. 1 is a side elevational view of the system of the present invention with a portion of the bin being broken away and showing the glass plate just before being loaded onto the top assembly which is in a substantially vertical position.

The system 11 of the present invention comprises in general a self-propelled apparatus 13 mounted on tracks 15, and a plurality of bins 17 (only one shown) for storing the glass to be cut. The bins 17 are of any suitable construction and include supporting means 19 (only one of which is shown) for supporting the glass G in a substantially vertical position, as for example, 2° inclined to the vertical, for supporting the glass along the lower edge thereof and for supporting the glass in a plane which is perpendicular to vertical planes passing through the tracks 15. It will be understood that the other bins 17 (not shown) will be disposed on either side of bin 17 in parallel relationship therewith and along the tracks 15 so that the apparatus 13 may be moved to the selected bin for the withdrawal of the glass therefrom. Tracks 15 are preferably two in number and of any suitable construction, as for example, in the form of railroad tracks, and supported from a suitable supporting structure as supporting structure S.

Self-propelled apparatus 13 includes in general a base 21, a top assembly 23, and wheels 25 runningly supporting apparatus 13 on tracks 15. Wheels 25 are preferably four in number including a forward pair and a rearward pair arranged at the corners of base 21. Thus, a forward axle 27 upon which the forward wheels 25 are mounted extends through bearings 29 attached to base 21, and rearward axle 31 extends through bearings 33 attached to base 21. Rearward axle 31 is driven as by means of the motor 35 mounted on base 21 and coupled through a suitable gearbox 37, pulleys 39, 41 and continuous belt 43 to the rearward axle 31. Motor 35 is preferably a reversible motor and is controlled through a suitable electrical control system including switch 45 mounted from top assembly 23 and to which electricity is supplied by suitable means such as an extensible power cord, not shown, extending upwardly through supporting structure S. Thus, the operator may position himself in the area marked "X" in FIG. 4 and may cause the self-propelled apparatus 13 to move in one direction or another along the tracks 15 and to a selected bin 17 as the operator walks along with the apparatus.

Base 21 is preferably of open framework construction and includes lower horizontal members 47 and vertical members 49 fixedly attached to the horizontal members 47 and extending upwardly therefrom. There are preferably six vertical members 49, that is, one at each corner of base 21 and an intermediate one on each side of the base. For purposes of clarity, the rearward ones of vertical members 49 have been designated 49', the forward ones 49'' and the intermediate ones 49'''.

Top assembly 23 is pivotally mounted adjacent one side thereof from the vertical members 49 along one side of base 21 for pivot about a horizontal axis as by means of the pivot points 53 extending through aligned apertures in the upper ends of vertical members 49 and through the lugs 55 fixedly attached to the underside of top assembly 23. Thus, the top assembly 23 is pivotable from a substantially horizontal position, as viewed in FIGS. 5 and 6, to substantially vertical positions, as for example, like that shown in FIG. 7. Thus, the top assembly 23 is adapted to be moved to the substantially vertical loading position, as for example, 2° from the vertical, so that the top assembly 23 can be aligned with the bins 17 and the glass G supported thereon. The means for moving top assembly 23 between said horizontal and vertical positions is preferably by hydraulic piston-cylinder assemblies 57 coupled at the opposite ends thereof to the underside of top assembly 23 and a horizontal member 47. The hydraulic cylinder assemblies 57 are actuated by suitable hydraulic circuits well known to those skilled in the art and which includes a control valve 59, whereby the operator may stand at the position X in FIG. 4 and operate the control valve 59 by the handle 59' and cause the top assembly 23 to move into the desired substantially vertical loading position or the substantially horizontal position in which horizontal position the top assembly 23 is resting on the upper ends of vertical members 49. Apparatus 13 is preferably counterbalanced by suitable weights on base 21 as at 60.

The broad concept of air flotation is well known to those skilled in the art, and therefore, the following general description of the air flotation system 61 in combination with top assembly 23 should suffice. An air blower 63 is mounted on base 21 and delivers air under pressure through a conduit 65 to a manifold 67 mounted beneath top assembly 23 and which leads to a plurality of branches 69 that in turn lead to an air space 71 provided in top assembly 23. Top assembly 23 is covered with felt 73, with the upper surface of the felt providing the top surface 75 of top assembly 23 upon which the glass G is adapted to rest. There are a plurality of vertically extending bores 77 that extend from air space 71 upwardly through the upper horizontal wall 79 of top assembly 23 and through felt 73 so that when desired, upwardly projecting streams of air may be provided through bores 77 from air blower 63 to float the glass G. Air blower 63, it will be understood, is provided with suitable electric circuit means including a switch, not shown.

Figure 2:
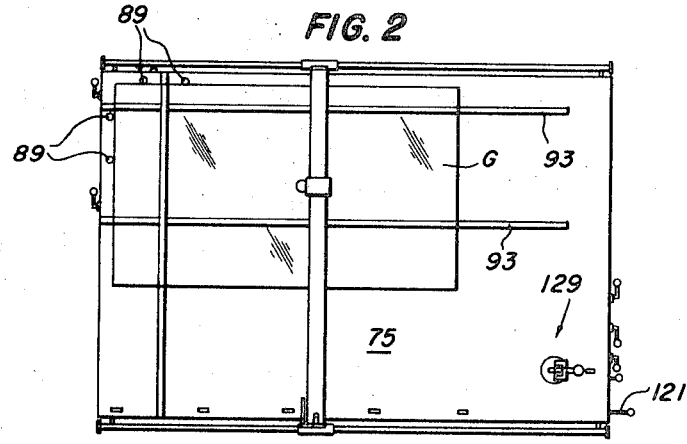
FIG. 2 is a top plan view of the self-propelled apparatus machine of the present invention showing the glass positioned for cutting or scoring.

Top assembly 23 additionally includes a rectangular open framework 83 (see FIGS. 8 and 9) of suitable construction, which preferably includes channel members 85 and which support the upper part 87 of top assembly 23, heretofore described and which includes felt 73 and the part of the top assembly which defines air space 71. A plurality of upstanding stops 89 are provided along one corner of top assembly 23 and upstand from top surface 75 so that with the top assembly 23 in a horizontal position, the air flotation may be used to position the glass G in the position shown in FIG. 2, and in which position the dimensions of the glass to be cut may be measured, as will be better understood in the description to follow later.

Figure 3:
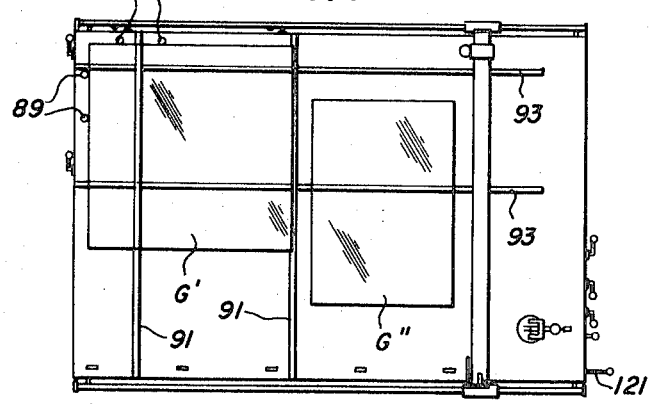
FIG. 3 is a view similar to FIG. 2, but showing the glass after being broken along the scoreline.

Top assembly 23 includes suitable breaking bars 91, 93. Since the broad concept of breaking bars is well known to those skilled in the art, the following general description should suffice: Breaking bars 91 are mounted transversely of top assembly 23 in recesses 95 and have suitable means as the hydraulic piston-cylinder assemblies 97 attached to the underside thereof for moving the breaking bars 91 between a retracted position shown in solid lines in FIG. 12 to an extended position shown in broken lines in FIG. 12 to exert upward pressure on the glass G and break it into two parts as G' and G'' shown in FIGS. 3 and 12. Hydraulic piston-cylinder assemblies 97 are provided with suitable hydraulic supply and control circuits including the separate valves 99 for controlling each of the breaking bars 91 and which valves are located adjacent one edge of the top assembly 23. The breaking bars 93 extend longitudinally of the top assembly 23 and are constructed in a similar manner to breaking bars 91 and with similar associated equipment therewith for the actuation thereof in the same manner as breaking bars 91. Therefore, a description of same is not deemed to be necessary.

Figure 13:
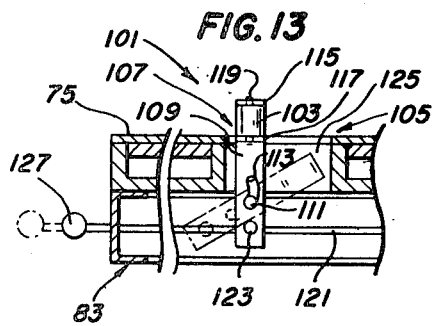
FIG. 13 is a fragmentary sectional view taken as on the line XII-XIII of FIG. 4.

A supporting means or mechanisms 101 are provided in top assembly 23 adjacent side 51 for supporting the glass in a substantially vertical position during the loading thereof. Supporting mechanisms 101 respectively include a roller 103 positioned adjacent side 51 of top assembly 23. A mounting mechanism 105 movably mounts roller 103 for movement between a glass loading position in which roller 103 extends outwardly beyond top surface 75 with the axis thereof being substantially perpendicular to top surface 75 and a retracted position in which roller 103 is retracted beneath top surface 75. In FIG. 13 one of the rollers 103 is shown in solid lines in said loading position and in broken lines in said retracted position. Mounting mechanism 105 includes a bracket 107 respectively supporting roller 103. Bracket 107 includes a lever portion 109 which is mounted for movement in a pivotal arc as by means of the pin 111 fixedly attached to framework 83 and extending through an arcuate slot 113 in bracket 107. The outer end of bracket 107 is provided with a pair of spaced flanges 115, 117 which extend perpendicular to lever portion 109 and rotatably supports roller 103 by means of the axle 119 of the roller 103 extending through apertures in the flanges 115, 117. The inner end of bracket 107 is pivotally attached to an elongated rod 121 by suitable means as the pivotal connection 123. The bracket 107 is disposed in a slot 125 in top assembly 23 so that room is provided for the bracket to move between said loading and said retracted positions when the rod 121 is moved by the operator grasping the knob 127 fixed on the end of the rod. All the mechanisms 101 are identical and the rollers 103 thereof move simultaneously since they are coupled to rod 121 respectively by the brackets 107. The knob 127 is located adjacent the operator's position marked X in FIG. 4, and when the knob 127 is moved outwardly into the broken line position shown in FIG. 13, the brackets 107 and the rollers 103 will be retracted into the broken line position shown in FIG. 13, and when the rod 127 is moved into the solid line position shown in this FIG., the brackets and rollers will move into the loading position shown in solid lines in this FIG. When the rollers 103 are in the loading position, the upper surfaces of the rollers are in alignment horizontally with the supporting structure 19 on the bin 17 to be unloaded.

The retrieving mechanism 129 for pulling the glass G from the bin 17 onto the rollers 103 is preferably constructed as follows: A suitable suction cup device 131 well known to those skilled in the art is provided which is attached to the glass G, as best seen in FIG. 1. A flexible line, as a cable 133, is attached at one end to suction cup device 131 and extends through a slot 135 in top assembly 23 and around a suitable pulley 137, thence to a reel 139, to which is coupled an electric motor 141 for rotatably driving the reel. Motor 141 has an electrical circuit, not shown, for supplying power thereto and which includes a switch 143. There is provided an actuating handle 144 for a suitable clutch, not shown, between motor 141 and reel 139 so that the operator may manipulate handle 144 to cause the motor 141 to rotate the reel 139 and pull the glass G onto the rollers 103. After the glass G is loaded onto the top assembly 23, the top assembly is moved by the operator actuating valve 59 so that the top assembly is moved into the substantially horizontal position.

A bridge assembly 145 is provided across top assembly 23 and is movable longitudinally of the top assembly 23 on rods 147, 149 disposed on opposite sides of top assembly 23. Rods 147, 149 are mounted in spaced relationship to the top assembly 23 respectively by the mounting studs 151, 153 which are fixedly attached to the channel members 85 and to the rods 147, 149. Bridge assembly 145 includes sleeves 155, 157 respectively slidably mounted on rods 147, 149 and provided with slots 159, 161 through which mounting studs 151, 153 respectively extend. Bridge assembly 145 also includes end plates 163, 165 fixedly attached to sleeves 155, 157 respectively and extending upwardly therefrom, and a transverse hollow beam or member 167 spanning the space between end plates 163, 165 and fixedly attached thereto at the opposite ends thereof.

Holding means 168 are provided for releasably holding bridge assembly 145 at a selected position relative to top assembly 23 and which preferably includes a pair of such means mounted on end plates 163, 165 with the following description of the one mounted on end plate 163 being sufficient for both, since they are substantially identical. Corresponding parts on the holding means located on end plate 165 are designated by the same numeral with the addition of the prime mark. A substantially vertical plunger 169 is slidably mounted in a bracket 171 affixed to end plate 163 with the plunger 169 extending upwardly beyond and downwardly below the bracket 171. The lower end of plunger 169 is adapted to extend through an aperture, not shown, provided in sleeve 155 and into engagement with rod 147 when the device is in a locked position. Plunger 169 is urged upwardly by suitable resilient means such as a spring, not shown, in bracket 171 to a normally disengaged position relative to rod 147. A cranklike member 173 is rotatably mounted on end plate 163 and is provided with an eccentric member 175 fixedly attached thereto so that the member 173 may be turned in the opposite direction to release the plunger 169 from the rod. The cranklike member 173 is preferably omitted from holding means 168' and instead a rod 176 interconnects eccentrics 175 and 175' so that the operator may operate both holding means 168, 168' by turning member 173.

A pair of rods 177, 179 span the space between end plates 163, 165 above transverse member 167 and are fixedly attached at the opposite ends thereof to the end plates. Rods 177, 179 are in parallel spaced apart relationship relative to each other and relative to top surface 75. A carriage 181 is freely movably mounted on rods 177, 179 for free movement by hand from side 183 of top assembly 23 to the opposite side 51 thereof. Carriage 181 is somewhat S-shaped in cross section, as viewed in FIG. 10, and includes an upper portion 185 disposed above transverse member 167 and a lower portion 187 disposed alongside of transverse member 167 with an intermediate portion 189 integrally interconnecting portions 185, 187. It will be understood that, if desired, instead of integrally interconnecting portions 185, 187 by portion 189, the portion 187 may be supported from portion 185 by any suitable adjustment means so that portion 187 may be adjusted vertically to accommodate wide ranges of thicknesses of glass G. Upper portion 185 is provided with a pair of spaced apart horizontally extending bores 191, 193 respectively receiving rods 177, 179. Preferably, suitable bearings, not shown, are provided in bores 191, 193 to engage rods 177, 179 and reduce friction so that carriage 181 will move freely from one side to the othere of top assembly 23. Also, rods 177, 179 are preferably supported from transverse member 167 along the length thereof at spaced intervals by studs 194, which extend through longitudinal openings 194' provided in portion 185.

Figure 10:
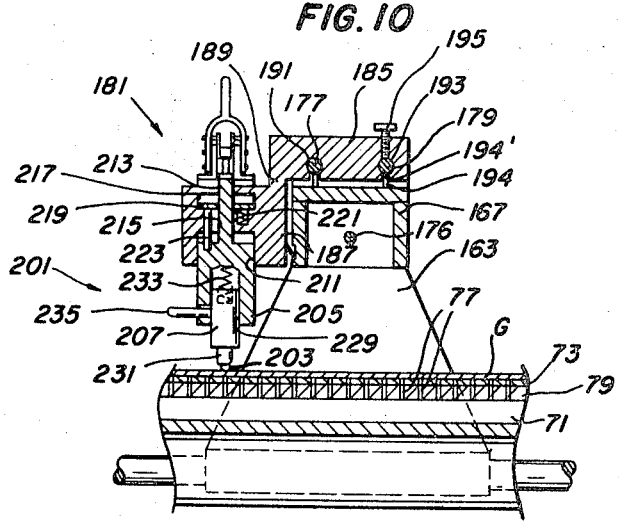
FIG. 10 is a sectional view taken as on the line X—X of FIG. 8.
Figure 11:
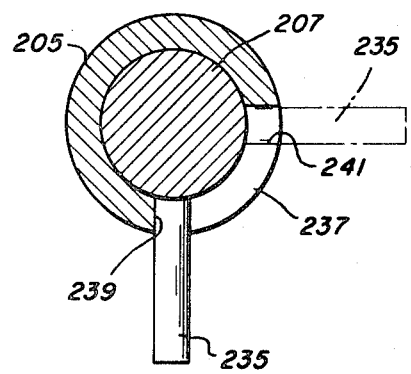
FIG. 11 is an enlarged sectional view taken as on the line XI—XI of FIG. 9.

Means is provided for releasably holding carriage 181 at a selected position relative to bridge assembly 145 and which means preferably comprises a set screw 195 received in a threaded bore in upper portion 185 so that the end of the set screw is adapted to engage rod 179, as best seen in FIG. 10. This is for the purpose of setting the machine up for longitudinally cutting the glass G, as will be better understood in the description of the operation to follow later, and in which is utilized a pointer 197 supported from lower portion 187 to indicate the position of the carriage by a gauge 199 extending along lower portion 187.

Figure 8:
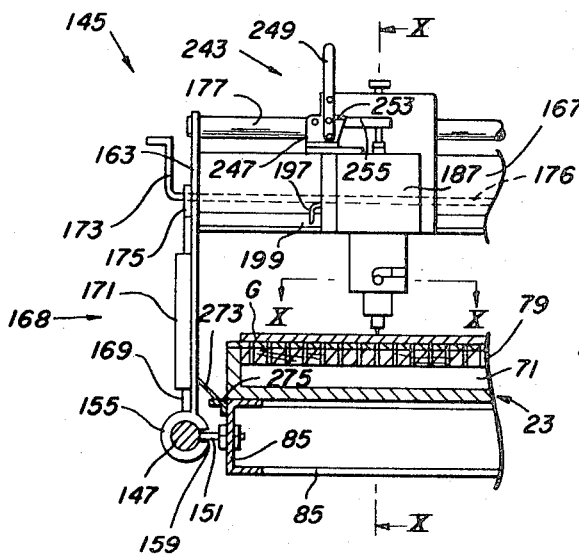
FIG. 8 is a sectional view taken as on the line VIII—VIII of FIG. 4 and showing the carriage assembly adjacent one side of the apparatus.
Figure 9:
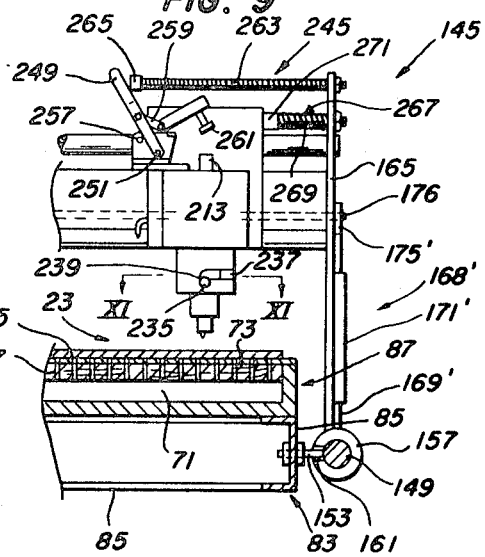
FIG. 9 is a sectional view taken as on the line IX—IX of FIG. 4 and showing the carriage assembly adjacent the opposite side of the apparatus.

A head assembly 201 movably supports a glass cutter 203 from carriage 181 for movement of the glass cutter between a disengaged position relative to the glass G on top assembly 23, as viewed in FIG. 9, to an engaged position relative to the glass G on top assembly 23, as viewed in FIG. 9, to an engaged position relative to the glass G on top assembly 23, as best viewed in FIGS. 8 and 10. It will be understood that the term "glass cutter" as used herein and "glass scoring" are equivalent and that actually the glass cutter 203 will score the top of the glass to be subsequently broken or severed.

Head assembly 201 includes in general an outer head portion 205 and an inner head portion 207. Outer head portion 205 is preferably cylindrical and slidably fits in a corresponding socket 211 provided in the lower end of lower portion 187. Outer head portion 205 is provided with a reduced projection 213 extending upwardly through a bore 215 in lower portion 187 and upwardly beyond the top surface of lower portion 187. Bore 215 is enlarged intermediate the upper and lower ends thereof as at 217 to receive a flange 219 fixedly attached to projection 213. In a recess provided in lower portion 187 beneath flange 219 a spring 221 engages the lower surface of flange 219 and urges the flange and outer head portion 205 upwardly to carry the related parts and glass cutter 203 upwardly to the disengaged position shown in FIG. 9. A pin 223, which is in parallel relationship to projection 213, extends between flange 219 and outer head portion 205 slidably through a bore in portion 187 to prevent outer head portion 205 from turning relative to carriage 181.

Inner head portion 207 is preferably cylindrical and fits slidably into a socket 229 in the lower end of outer head portion 205. The lower end of inner end portion 207 is preferably reduced in diameter as at 231 and carries the cutter per se 203 which is in any suitable form, as for example, a sharpened circular wheel. A spring 233 disposed in socket 229 between outer head portion 205 and inner head portion 207 urges inner head portion 207 and cutter 203 downwardly so that the cutter 203 is spring-loaded when in the engaged position relative to the glass G whereby cutter 203 will conform to any irregularities in the glass G. A handle 235 is fixedly attached at the inner end thereof to inner head portion 207 and extends radially outwardly therefrom through an inverted U-shaped slot 237 in outer head portion 205. Inverted U-shaped slot 237 has a first notch portion 239 at one end thereof and a second notch portion 241 at the opposite end thereof, which notch portions are adapted to selectively receive handle 235. When handle 235 is in first notch portion 239, glass cutter 203 is positioned for cutting the glass G in directions extending longitudinally of top assembly 23 and when handle 235 is in notch portion 241, cutter 203 is in a position to cut the glass G transversely of top assembly 23. In other words, when handle 235 is in notch portion 239, the plane of cutter wheel 203 extends longitudinally of top assembly 23 and when handle 235 is in notch portion 241, the plane of cutter wheel 203 extends transversely of top assembly 23.

An actuating mechanism 243 is mounted on carriage 181 and operably coupled to head assembly 201 for moving glass cutter 203 into said engaged position shown in FIGS. 8 and 10 and for engaging a trip mechanism 245 when carriage 181 is on side 51 of top assembly 23 to cause glass cutter 203 to move into said disengaged position shown in FIG. 9. Actuating mechanism 243 is preferably an over-center type of clamping mechanism known as an American toggle clamp and well known to those skilled in the art. Thus, actuating mechanism 243 includes a base 247 fixedly attached to the upper surface of lower portion 187, a hand lever 249 pivotally attached to base 247 for pivot about a horizontal axis as at 251, a stop 253 provided on base 247, a lever arm 255 pivotally attached to base 247 for pivot about a horizontal axis as at 257, and a link 259 pivotally attached at the opposite ends thereof to lever arm 255 and hand lever 249. A foot 261 is fixedly attached to lever arm 255 adjacent the outer end thereof. When hand lever 249 is in the position shown in FIG. 8, foot 261 is in engagement with the top end of projection 213 to hold glass cutter 203 in said engaged position. It will be understood that when lever 249 is in this position shown in FIG. 8 due to the over-center effect of the actuating mechanism, foot 261 will maintain this position and will hold glass cutter 203 downwardly against the glass until lever arm 255 is moved counterclockwise by engagement of hand lever 249 by trip mechanism 245 as best shown in FIG. 9 to cause the foot 261 to be released, and the lever arm 255 to be rotated counterclockwise as shown in this FIG. Trip mechanism 245 is of any suitable construction, as for example, a rigid rod 263 having a suitable head 265 on the end thereof and which rod is fixedly attached at the opposite end of end plate 165. At substantially the same time as trip mechanism 245 is tripping actuating mechanism 243, as above described, carriage 181 is engaging a resilient bumper 267 which causes the carriage 181 to move back to the other side 183 towards the operator of the machine. Bumper 267 is of any suitable construction, as for example, a spring 269 having a cap 271 on the end thereof with the other end of the spring being attached to end plate 165 by suitable means.

Figure 12:
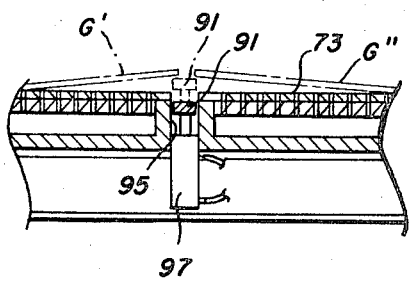
FIG. 12 is a fragmentary sectional view taken as on the line XII—XII of FIG. 4.

In describing the operation of the system 11 of the present invention, it is assumed that the top assembly 23 is in an unloaded horizontal position. The operator, not shown, standing at the position marked X in FIG. 4, operates the switch 45 to cause the apparatus 13 to move along the tracks 15 until the apparatus 13 is adjacent the bin 17 from which the glass G is to be retrieved. Then, the top assembly 23 is moved to a substantially vertical position (actually tilted 2° to the vertical) by actuating valve 59. Then, the operator more precisely aligns the top assembly 23 with the glass G by sighting down the surface 75 of the top assembly. Next, the operator attaches the suction cup device 131 to the glass G, as shown in FIG. 1, and then manipulates the lever 144 to cause reeling in of the cable 133 which pulls the glass G edgewise onto the rollers 103, that were previously moved to the loading position by the manipulation of knob 127. After the glass G has been moved over onto the apparatus 13, the top assembly 23 is moved to the horizontal position by actuating the valve 59. The operator then floats the glass over into the "zeroing" position shown in FIG. 2 wherein the two edges of the glass are against the stops 89. The operator releases the bridge assembly 145 so that it can move on rods 147, 149 by turning the cranklike member 173. The bridge assembly 145 is positioned at the proper position along the length of the top assembly 23 by observing the pointer 273, which is affixed to the end plate 163, and its relationship to the index scale 275 which is disposed along the length of the top assembly 23. When the bridge assembly 145 is positioned correctly so that the cutter 203, which has been disposed for a transverse cut (handle 235 in notch 241), is in line with the place on the glass to be cut, the cranklike member 173 is turned to lock bridge assembly 145 at this position. Then, carriage 181, if it is not already released from rods 177, 179, it is so released by turning set screw 195. Hand lever 249 is placed in the position best seen in FIG. 8 to engage cutter 203 with the glass G. The operator, standing on the side 183, pushes carriage 181 towards the opposite side 51, whereupon, when the carriage 181 reaches the opposite side 51, glass cutter 203 is released from the glass G, and the bumper 267 causes the carriage 181 to return to the operator. The operator then moves the scored line of the glass over one of the breaking bars 91 and actuates the breaking bar in a manner heretofore described to cause the glass to sever, as shown in FIG. 12. Other transverse cuts, if desired, are made in the glass G. Then, the longitudinal cut or cuts are made by positioning carriage 181 at the desired position on bridge assembly 145 and locking the brodge assembly in place by turning the set screw 195. The handle 235 is placed in notch portion 239, the handle 249 is moved to the position shown in FIG. 8, and the bridge assembly 145 is moved longitudinally of the apparatus by the operator to cause the longitudinal cut to be made. After the cuts have been made, the glass G is removed from the top assembly 23 ready for more glass to be loaded and cut in the manner heretofore described. It will be understood that either before or after cutting of the glass G, the self-propelled apparatus 13 may be utilized as a conveying means to convey the glass to the unloading area.

Although the invention has been described and illustrated with respect to a preferred embodiment thereof, it is not to be so limited since changes and modifications may be made therein which are within the full intended scope of this invention.

We claim:

1. In a plate glass cutting apparatus including a top assembly having a top surface, a first side and an opposite second side, means for cutting glass resting on said top surface comprising bridge means including first rod means extending across said top assembly from said first side to said second side, carriage means freely movably mounted on said first rod means for free movement by hand from said first side to said second side of said top assembly, trip means on said second side of said top assembly, bumper means on said second side of said top assembly for engagement by said carriage means to move said carriage back from said second to said first side, glass cutter means, head means, for movably supporting said cutter means from said carriage means for movement between a disengaged position relative to the glass on said top assembly and an engaged position relative to the glass on said top assembly, and actuating means operably coupled to said head means for moving said glass cutter means into said engaged position and for engaging said trip means when said carriage means is on said second side of said top assembly to cause said glass cutter means to move into said disengaged position.

2. The structure of claim 1 in which is included second rod means extending longitudinally of said top assembly and movably supporting said bridge means for movement of said bridge means longitudinally of said top assembly.

3. The structure of claim 2 in which said head includes means for positioning said cutter means in a first position for cutting the plate glass in directions extending transversely of said top assembly and in a second position for cutting the plate glass in directions extending longitudinally of said top assembly.

4. The structure of claim 3 in which is included means for releasably holding said bridge means at a selected position relative to said top assembly and means for releasably holding said carriage means at a selected position relative to said top assembly.

* * * * *